United States Patent
Goetze et al.

(10) Patent No.: US 6,718,927 B2
(45) Date of Patent: Apr. 13, 2004

(54) VEHICLE ELECTRICAL SYSTEM, PARTICULARLY FOR A TRUCK

(75) Inventors: Thomas Goetze, Chemnitz (DE); Hans-Peter Johanning, Zell am Main (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 10/108,642

(22) Filed: Mar. 29, 2002

(65) Prior Publication Data

US 2002/0152981 A1 Oct. 24, 2002

(30) Foreign Application Priority Data

Mar. 30, 2001 (EP) .............................. 01108180

(51) Int. Cl.$^7$ ................................. F02N 11/08
(52) U.S. Cl. .............................. 123/179.3; 123/179.28; 290/31; 290/50; 307/10.6
(58) Field of Search ................ 123/179.28, 179.1, 123/179.3; 290/31, 38 R, 50; 307/10.6

(56) References Cited

U.S. PATENT DOCUMENTS

| | | | |
|---|---|---|---|
| 4,335,318 A | * 6/1982 | Mabuchi et al. | 290/31 |
| 4,346,773 A | * 8/1982 | Hofbauer et al. | 180/165 |
| 4,412,137 A | * 10/1983 | Hansen et al. | 307/10.6 |
| 5,155,374 A | * 10/1992 | Shirata et al. | 290/38 R |
| 5,455,463 A | 10/1995 | Langnickel et al. | |
| 5,642,696 A | 7/1997 | Matsui | |

FOREIGN PATENT DOCUMENTS

| | | |
|---|---|---|
| DE | 43 02 809 A1 | 8/1993 |
| DE | 196 01 241 A1 | 7/1996 |
| DE | 197 52 661 A1 | 6/1999 |
| EP | 0 987 146 A2 | 3/2000 |
| EP | 1 013 506 A2 | 6/2000 |
| FR | 2 687 511 | 8/1993 |

* cited by examiner

*Primary Examiner*—Andrew M. Dolinar
(74) *Attorney, Agent, or Firm*—Sughrue Mion, PLLC

(57) ABSTRACT

Two low-voltage energy storage devices (B1 and B2) are provided in an arrangement that ensures, on the one hand, a high start power in the vehicle electrical system, resulting from being connected to a higher-level voltage, for a starter generator (SG) that is coupled to an internal combustion engine. The arrangement additionally ensures, on the other hand, full compatibility with low-voltage vehicle electrical system consumers (VB). The arrangement allows the two low-voltage energy storage devices (B1 and B2), either separately or when connected in parallel, to supply the vehicle electrical system consumers (VB) with a low voltage. In addition, the arrangement allows the two low-voltage energy storage devices (B1 and B2), when connected in series, to provide the high start power with increased voltage and correspondingly reduced current intensity at least for a cold start of the starter generator (SG). The arrangement, despite the above-mentioned versatility, is low in production costs and of minimal switching complexity.

20 Claims, 1 Drawing Sheet

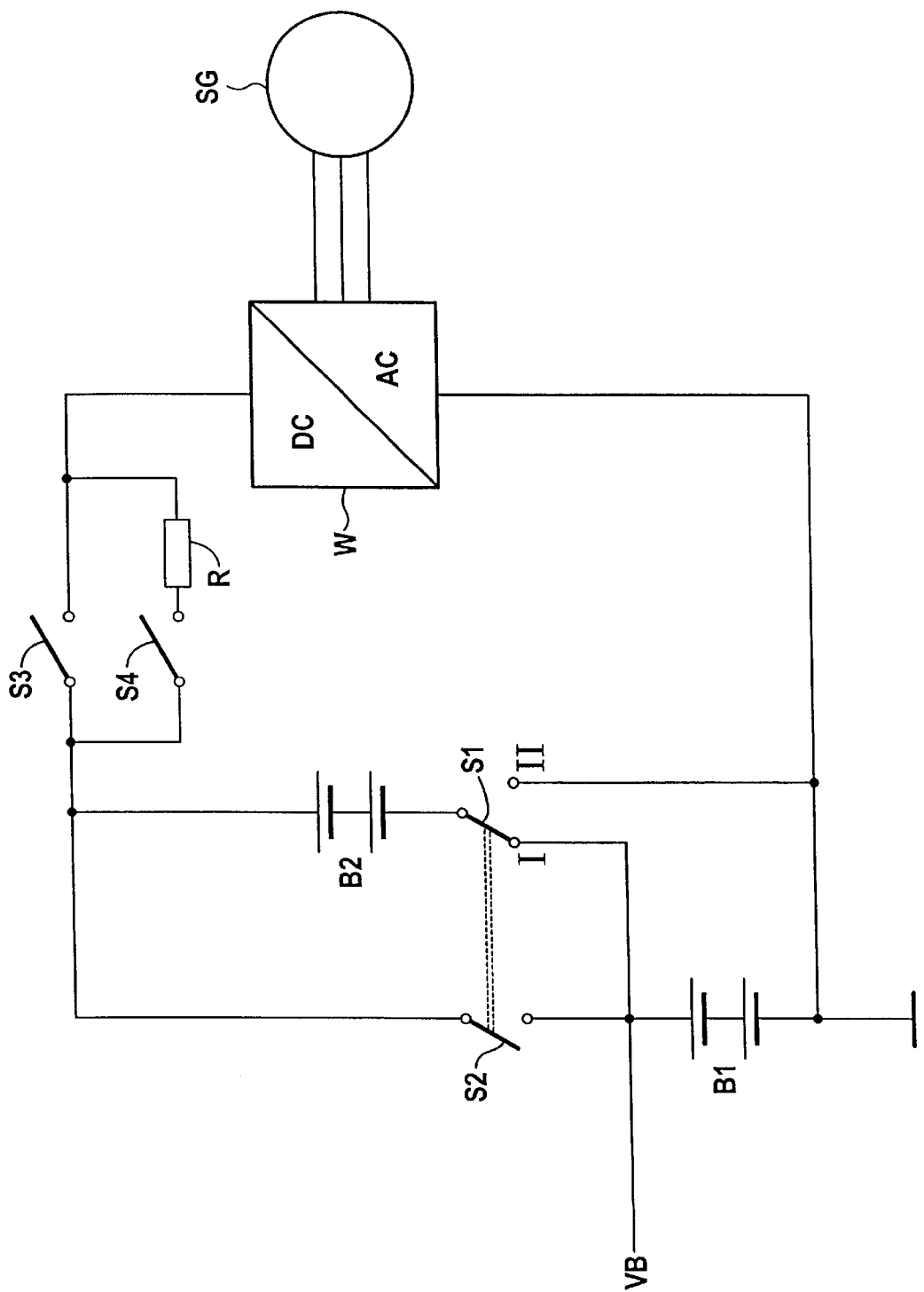

VEHICLE ELECTRICAL SYSTEM, PARTICULARLY FOR A TRUCK

This application claims priority from European Patent Application EP 011 08 180.9, filed on Mar. 30, 2001, and incorporated in full into this application by reference.

FIELD OF AND BACKGROUND OF THE INVENTION

The invention relates to an onboard vehicle electrical system. More particularly, the invention relates to a vehicle electrical system that includes a low-voltage energy storage device, low-voltage consumers supplied by the energy storage device, and a starter generator.

Such a vehicle electrical system is known, for instance, from German Laid-Open Publication DE 197 52 661 A1. Vehicle electrical systems with a starter generator, coupled to an internal combustion engine, for automobiles generally have a 12/14V and a 36/42V voltage level. The introduction of the 36/42V level was in response to the increasing power requirements in the vehicle, particularly to cold-start the starter generator. Due to the correspondingly reduced current intensity, smaller winding cross sections can be selected for the machine configuration of the starter generator, and the losses in the inverter, which is fitted with semiconductor components and located between the starter generator and the DC voltage level, can be reduced.

For trucks or utility vehicles, the 24/28V voltage level has been introduced as a standard, also for reasons of compatibility between manufacturer-specific tractors and different types of trailers. For technical and economic reasons, it is unlikely that a 36/42V voltage level will be introduced in addition in the near future.

Two options are feasible to achieve a voltage that is higher than the relatively lower voltage of the vehicle electrical system and which is suitable to start the starter generator. The first, based on providing a low-voltage energy storage device, includes a step-up switching regulator fitted with semiconductor components and which raises the voltage supplying the starter generator. This can be done, e.g., using a start capacitor, e.g. as disclosed in the aforementioned DE 197 52 661 A1. As an alternative thereto, it would be possible, based on providing a higher-voltage energy storage device, to supply the low-voltage consumer components via a DC/DC converter fitted with semiconductor components.

OBJECTS OF THE INVENTION

One object of the present invention is to provide a vehicle electrical system that can be produced and operated at low cost and that permits the starting of the starter generator with current intensities that are not excessively high. It is a further object of the invention to provide a vehicle electrical system that is compatible with the conventional low voltage level, such as 24/28V for trucks, yet is nevertheless capable of supplying voltage to the low-voltage consumer components of the vehicle.

SUMMARY OF THE INVENTION

According to one formulation of the invention, these and other objects are achieved by a vehicle electrical system, in particular for a truck, that includes: (i) a first low-voltage vehicle electrical system energy storage device; (ii) low-voltage vehicle electrical system consumers supplied with voltage by the first energy storage device; (iii) a starter generator, which, in starter operation, is supplied with voltage from the first energy storage device and, in generator operation, re-supplies the first energy storage device with voltage; and (iv) an additional low-voltage energy storage device, which, in starter operation of the starter generator, is connected in series with the first energy storage device for a higher voltage for the starter generator and, in generator operation of the starter generator, is connected in parallel with the first energy storage device for a lower voltage.

German Laid-Open Publication DE 43 02 809 A1 (and its related publications FR 2 687 511 and U.S. Pat. No. 5,455,463) disclose a device to regulate or control the onboard system voltage of a vehicle during operation with a high current consumer in the form of a starter for an internal combustion engine using a main vehicle battery and an auxiliary battery. However, in contrast to the present invention, that device, in order to prevent side effects on other current consumers when the high current consumer is connected, provides that the auxiliary battery be connected in series, preferably with a reduced voltage, with the main battery, and that the high current consumer be supplied from the main battery and the remaining consumers from the series connection of the batteries.

The present invention provides a demand-adjusted series or parallel connection of the two energy storage devices. Starting from a compatible, low voltage of a basic voltage level (e.g., 24/28V) that corresponds to the requirements of the vehicle electrical system consumers, an advantageous, noticeably higher starting voltage for the starter generator (e.g., 48/56 V) can nevertheless be obtained to start, particularly cold-start, the starter generator, which is a strong consumer and which is typically coupled to an internal combustion engine. This is achieved merely by actuating switches, i.e., without resort to step-up switching regulators or high-voltage energy storage devices that cannot otherwise be used or can be used only with DC/DC chopper converters. At the same speed and torque, this results in a lower current per winding for the starter generator, a lower output current of the inverter, or a reduced load current for the energy storage device(s). The switching components required for switching between the series and parallel connections can be produced with little complexity and are simple to control.

BRIEF DESCRIPTION OF THE DRAWINGS

The invention will now be described in greater detail with reference to an exemplary embodiment schematically depicted in the FIGURE.

DETAILED DESCRIPTION OF THE PREFERRED EMBODIMENTS

The FIGURE shows a vehicle electrical system for a vehicle with a starter generator SG, which is typically coupled to an internal combustion engine (not shown). The starter generator SG is connected, via an inverter W having an intermediate circuit capacitor and via switching components S1 to S3, to a series or parallel connection of two low-voltage energy storage devices (B1, B2). At least one of these energy storage devices (B1, B2) is connected to the low-voltage consumers VB of the vehicle electrical system, to supply them with voltage.

A vehicle electrical system storage device B1, in particular a vehicle battery, feeds a main voltage level of a low voltage, preferably 24/28V, for the supply of the typical vehicle electrical system consumers VB. When a changeover switch S1 is switched to a switching position I and a first ON-OFF switch S2 is in an open position, an additional low-voltage energy storage device B2, which is advantageously and preferably of the same kind as the first storage device B1, in particular 24/28V, is connected in series with the vehicle electrical system energy storage device B1. As a result, particularly in a cold temperature phase, the starter generator SG can be started with a doubled, and thus appreciably higher voltage and a thereby correspondingly reduced current. The additional low-voltage energy storage device B2 may alternatively be embodied as a capacitor, e.g. a double layer capacitor.

By moving the changeover switch S1 to its switching position II and closing the first ON-OFF switch S2, the additional energy storage device B2 is switched parallel to the vehicle electrical system energy storage device B1. As a result, on the one hand, in generator operation of the starter generator SG, both or at least one of the two energy storage devices can be resupplied with a direct power flow via inverter W, or the electrical system consumers VB can be supplied directly. On the other hand, in starter operation of the starter generator SG in a warm temperature phase, the starter generator is supplied directly with low voltage, without switchover measures, from the parallel-connected energy storage devices B1, B2. Particularly advantageous is the high efficiency that can be achieved in generator operation, since, unlike prior art solutions, no lossy conversion or mutual adaptation of the different voltage levels, e.g., via DC/DC converters, is necessary.

A second ON-OFF switch S3 and a protective resistor R that can be switched parallel thereto, advantageously serve to protect the intermediate circuit capacitor of the inverter W from high, abrupt charging or discharging current loads when the energy storage devices B1, B2 are switched from series to parallel or from parallel to series connection. Accordingly, the second ON-OFF switch S3 is first opened prior to an intended switchover of the energy storage device in order to limit the charging/discharging current via the parallel current path with protective resistor R. A third ON-OFF switch S4, which is connected in series with protective resistor R, makes it possible to isolate the protective resistor R, and the inverter W, completely from the vehicle energy system, e.g., in case of prolonged operational interruptions or failure.

Especially low-cost electromechanically actuated contacts, particularly relays or contactors, can be used to implement the changeover switch S1 and/or the ON-OFF switches S2 to S4. If semiconductor switches are used, it is advantageous to use the current-limiting type for the changeover switch S1 and the first ON-OFF switch S2, so that adding a separate protective resistor R becomes unnecessary.

By way of explanation, not limitation, of the invention, the basic concept underlying the invention may be summarized as follows: In order to ensure, with modest production cost and switching complexity, on the one hand, a high starting power linked to an increased voltage for a starter generator (SG), which is coupled to an internal combustion engine, in the vehicle electrical system, and, on the other hand, full compatibility with the low-voltage vehicle electrical system consumers (VB), two low-voltage energy storage devices (B1 and B2) are provided. On the one hand, these energy storage devices, either separately or connected in parallel, are used to supply the vehicle electrical system consumers (VB) with a low voltage. On the other hand, connected in series, they ensure a high starting power with increased voltage and correspondingly reduced current intensity, at least in the case of a cold start of the starter generator (SG).

The above description of the preferred embodiments has been given by way of example. From the disclosure given, those skilled in the art will not only understand the present invention and its attendant advantages, but will also find apparent various changes and modifications to the structures and functions disclosed. It is sought, therefore, to cover all such changes and modifications as fall within the spirit and scope of the invention, as defined by the appended claims, and equivalents thereof.

What is claimed is:

1. Vehicle electrical system, comprising:
   a first low-voltage vehicle electrical system energy storage device;
   low-voltage vehicle electrical system consumers supplied with voltage by said first energy storage device;
   a starter generator, which, in starter operation, is supplied with voltage from said first energy storage device and, in generator operation, re-supplies said first energy storage device with voltage;
   an additional low-voltage energy storage device, which, in starter operation of said starter generator, is connected in series with said first energy storage device for a higher voltage for the starter generator and, in generator operation of said starter generator, is connected in parallel with said first energy storage device for a lower voltage; and
   semiconductor switches that control switchover of said additional energy storage device between the series connection and the parallel connection, wherein said semiconductor switches comprise current-limiting semiconductor switches.

2. Vehicle electrical system as claimed in claim 1, installed in and configured for a commercial truck.

3. Vehicle electrical system as claimed in claim 1, wherein said first energy storage device is a vehicle battery.

4. Vehicle electrical system as claimed in claim 3, wherein said vehicle battery is a 24/28V battery, said consumers are 24/28V consumers, said additional energy storage device is a 24/28V energy storage device, and the higher voltage is 48/56V.

5. Vehicle electrical system as claimed in claim 3,
   wherein said additional energy storage device is a second vehicle battery of essentially the same type as the first energy storage device.

6. Vehicle electrical system as claimed in claim 1,
   wherein said additional energy storage device is a capacitor.

7. Vehicle electrical system as claimed in claim 6,
   wherein said capacitor is a double layer capacitor.

8. Vehicle electrical system as claimed in claim 1,
   wherein said first energy storage device is connected to and feeds said vehicle electrical system consumers even when said first energy storage device is series connected to said additional energy storage device.

9. Vehicle electrical system as claimed in claim 1, further comprising:
   an inverter having an intermediate circuit capacitor; and
   a protective resistor;
   wherein said protective resistor is periodically connected between said inverter and said additional energy storage device prior to a series-to-parallel or parallel-to-series switchover of said additional energy storage device.

10. Vehicle electrical system as claimed in claim 1,
    wherein said first energy storage device and said additional energy storage device are connected in series during a cold start of the starter generator.

11. Vehicle electrical system as claimed in claim 1,
wherein said first energy storage device and said additional energy storage device are connected in parallel during a warm start of the starter generator.

12. Vehicle electrical system as claimed in claim 1,
wherein said first energy storage device and said additional energy storage device are connected in parallel during the generator operation of the starter generator.

13. An electrical system of a motor vehicle, comprising:
a first battery and a second battery;
a starter generator, which operates at least in a starter mode and a generator mode; and
a switch arrangement that, in the starter mode, connects said first and said second battery in series, to power said starter generator with a high voltage, and that, in the generator mode, recharges at least said first battery from said starter generator;
wherein said switch arrangement comprises semiconductor switches that control switchover of said second battery between the starter mode and the generator mode, wherein said semiconductor switches comprise current-limiting semiconductor switches.

14. The electrical system according to claim 13, wherein said switch arrangement, in the generator mode, connects said first and said second battery in parallel, to recharge said first and said second battery from the starter generator.

15. The electrical system according to claim 13, further comprising at least one low-voltage component, wherein said first battery powers said component in both the starter mode and the generator mode.

16. The electrical system according to claim 13, wherein said switch arrangement comprises a changeover switch and an on-off switch, commonly controlled, to switch the system between the series connection of said batteries and the parallel connection of said batteries.

17. The electrical system according to claim 13, wherein said first battery and said second battery are of an identical voltage rating.

18. The electrical system according to claim 13, further comprising:
an inverter provided between said batteries and said starter generator;
a protective resistor; and
at least one further switch that connects said protective resistor between at least one of said first batteries and said inverter when said switch arrangement switches the system between the series connection of said batteries and the parallel connection of said batteries.

19. Vehicle electrical system, comprising:
a first low-voltage vehicle electrical system energy storage device;
low-voltage vehicle electrical system consumers supplied with voltage by said first energy storage device;
a starter generator, which, in starter operation, is supplied with voltage from said first energy storage device and, in generator operation, re-supplies said first energy storage device with voltage;
an additional low-voltage energy storage device, which, in starter operation of said starter generator, is connected in series with said first energy storage device for a higher voltage for the starter generator and, in generator operation of said starter generator, is connected in parallel with said first energy storage device for a lower voltage;
an inverter having an intermediate circuit capacitor; and
a protective resistor;
wherein said protective resistor is periodically connected between said inverter and said additional energy storage device prior to a series-to-parallel or parallel-to-series switchover of said additional energy storage device.

20. An electrical system of a motor vehicle, comprising:
a first battery and a second battery;
a starter generator, which operates at least in a starter mode and a generator mode; and
a switch arrangement that, in the starter mode, connects said first and said second battery in series, to power said starter generator with a high voltage, and that, in the generator mode, recharges at least said first battery from said starter generator;
an inverter provided between said batteries and said starter generator;
a protective resistor; and
at least one further switch that connects said protective resistor between at least one of said first batteries and said inverter when said switch arrangement switches the system between the series connection of said batteries and the parallel connection of said batteries.

* * * * *